United States Patent
Nam et al.

(10) Patent No.: US 7,917,936 B2
(45) Date of Patent: Mar. 29, 2011

(54) DIGITAL BROADCASTING RECEIVING APPARATUS AND METHOD FOR UPGRADING SOFTWARE THEREOF

(75) Inventors: Kyung-chul Nam, Suwon-si (KR); Doo-hee Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 374 days.

(21) Appl. No.: 11/777,403

(22) Filed: Jul. 13, 2007

(65) Prior Publication Data
US 2008/0178247 A1 Jul. 24, 2008

(30) Foreign Application Priority Data
Jan. 22, 2007 (KR) .................. 10-2007-0006653

(51) Int. Cl.
H04N 7/16 (2006.01)

(52) U.S. Cl. .................. 725/132; 725/140; 725/152
(58) Field of Classification Search .................. 725/132, 725/141, 153, 140
See application file for complete search history.

(56) References Cited

U.S. PATENT DOCUMENTS
2005/0050315 A1* 3/2005 Burkhardt et al. ............ 713/150
2007/0067820 A1* 3/2007 Cha ............................... 725/151
* cited by examiner

*Primary Examiner* — Hunter B Lonsberry
(74) *Attorney, Agent, or Firm* — Sughrue Mion, PLLC

(57) ABSTRACT

A digital broadcasting receiving apparatus and a method for upgrading software thereof are provided. The digital broadcasting receiving apparatus includes a memory interface unit which supports an interface with an external memory device; a platform unit which requests a headend whether an upgrade of software is acceptable, when the external memory device is connected to the memory interface unit; and a function execution unit which upgrades previously installed software using software in the external memory device, when notified from the headend that the upgrade of software is acceptable.

17 Claims, 4 Drawing Sheets

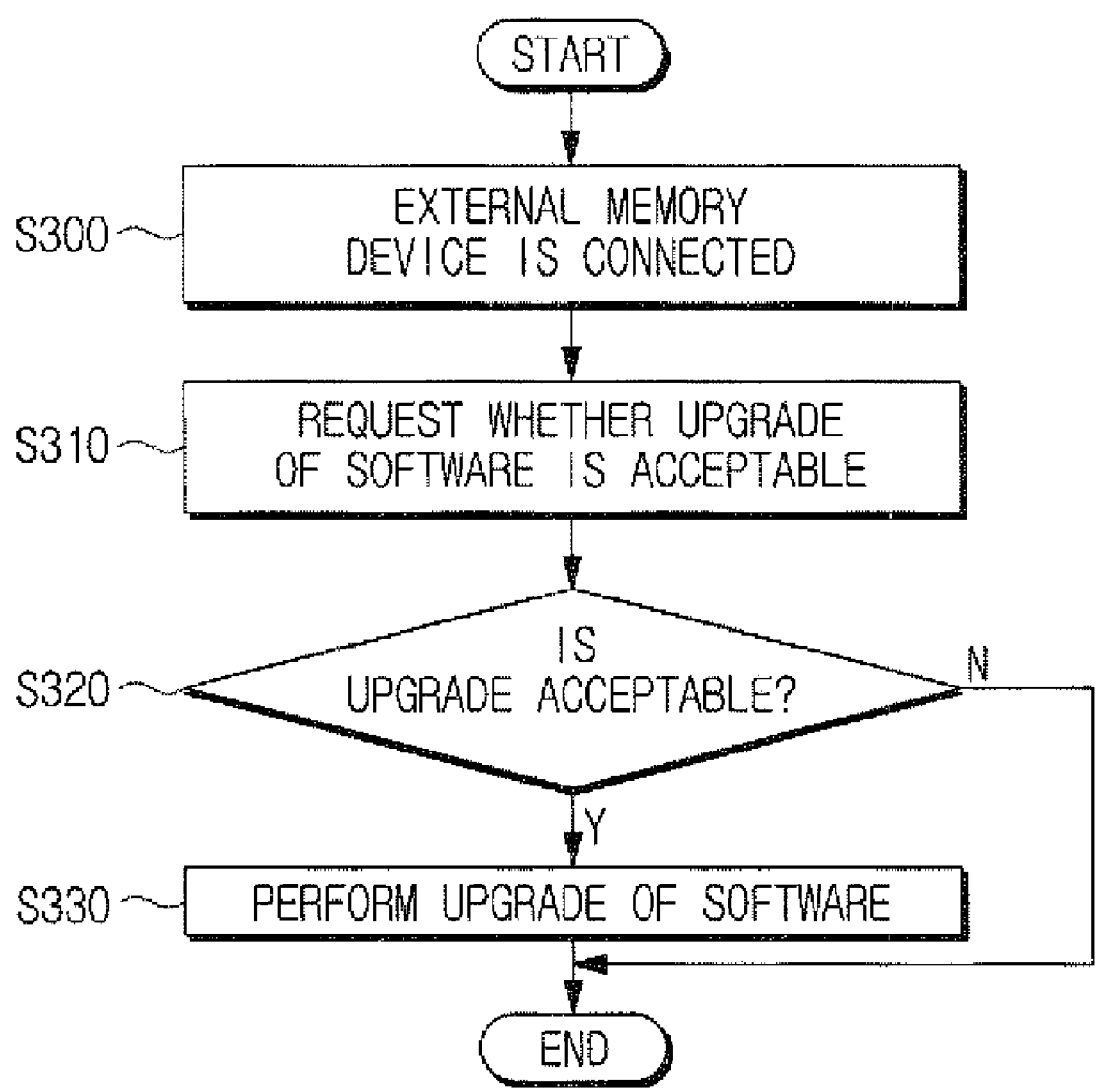

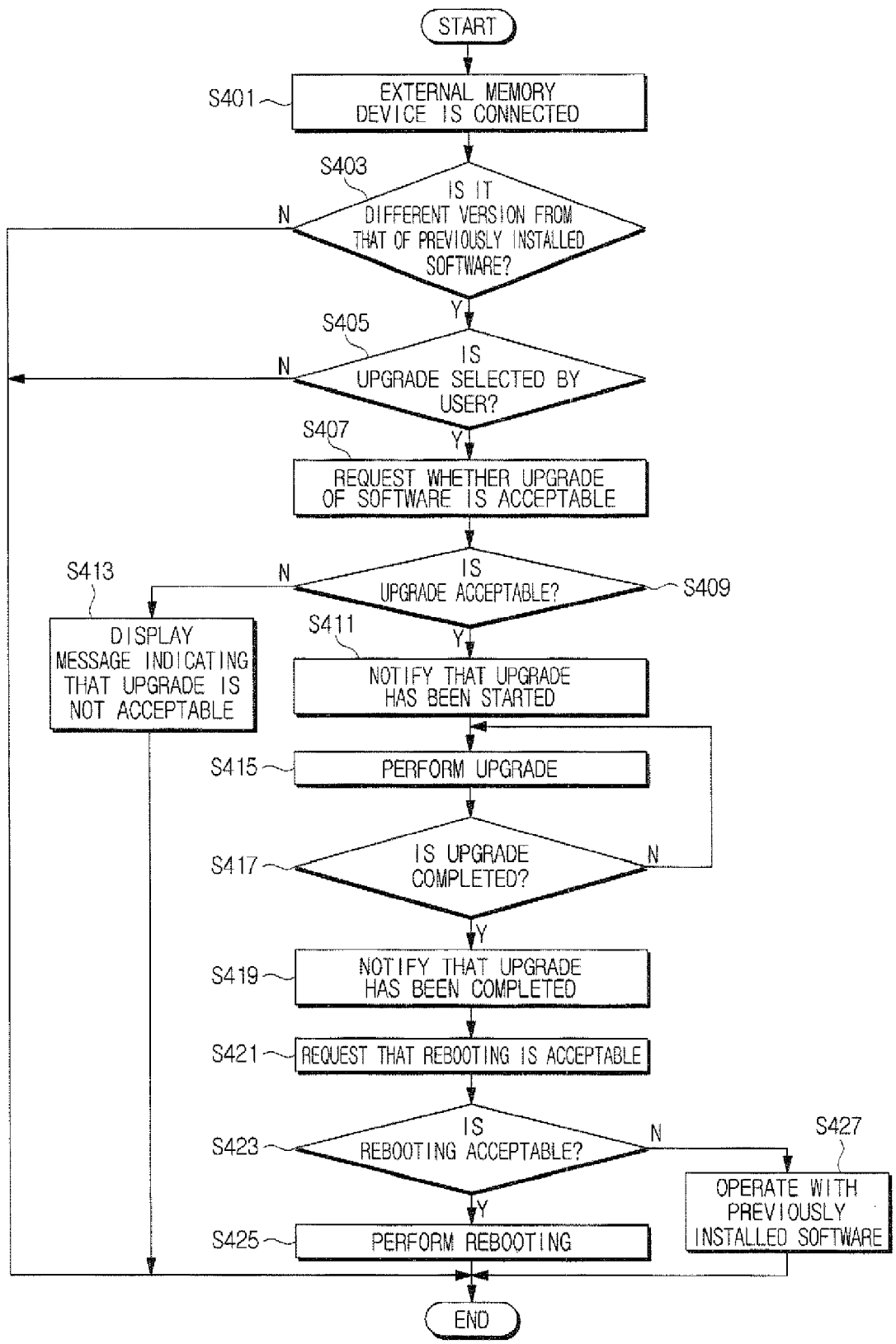

DIGITAL BROADCASTING RECEIVING APPARATUS AND METHOD FOR UPGRADING SOFTWARE THEREOF

CROSS-REFERENCE TO RELATED APPLICATION

This application claims priority from Korean Patent Application No. 10-2007-0006653, filed Jan. 22, 2007 in the Korean Intellectual Property Office, the disclosure of which is incorporated herein in its entirety by reference.

BACKGROUND OF THE INVENTION

1. Field of the Invention

Apparatuses and methods consistent with the present invention relate to receiving a digital broadcasting and upgrading software of a digital broadcasting receiving apparatus, and more particularly, to upgrading the software of the digital broadcasting receiving apparatus, which allows a headend to grasp the status of software upgrade for each digital broadcasting receiving apparatus through an external memory device.

2. Description of the Related Art

With advances of digital technology, a digital broadcasting receiving apparatus, such as a digital television (TV), could now have interactivity, not just having a function to display broadcasting signals received from broadcasting stations, but also having a function to send user's intention to the broadcasting stations.

In this way, what enables a TV to have the interactivity is OpenCable Applications Platform (OCAP) and Advanced Common Applications Platform (ACAP) specifications, which are both data broadcasting standards.

A user can send TV-related information and his intention to a broadcasting station using a variety of Java Application Program Interfaces (APIs) which are defined in the OCAP or ACAP specification.

Furthermore, a broadcasting station can more positively control a TV compared to a case where a conventional unidirectional TV is used. The "positive control of TV" means that most of conventional TV functions can be implemented under the control of the broadcasting station. For example, the broadcasting station can control functions, such as TV channel selection, and video format change.

As stated above, though a broadcasting station is allowed to positively control a TV by the OCAP or ACAP specification, when a user upgrades software installed in a conventional TV at his or her own discretion, there is no method for allowing the broadcasting station to recognize this.

A method for upgrading software installed in a conventional TV will be briefly described. When a memory device is connected to a TV by a user, the TV will identify a version of software to be upgraded and a version of previously installed software. If the two versions are identical, then the upgrade will not proceed, but if the two versions are different from each other, then the upgrade will proceed.

In the OCAP or ACAP specification, a variety of APIs are defined which have to be provided for a TV. However, APIs are not defined for exchanging information between a broadcasting station and a TV concerning software upgrade whether it is performed, how it is progressed, or the like, and therefore the broadcasting station cannot recognize whether the software installed in the TV is upgraded by the user.

As stated above, since information exchange between a broadcasting station and a TV concerning software upgrade is not implemented, the software upgrade in the TV is implemented without considering the status of the broadcasting station. Accordingly, a problem occurs in TV software version management by the broadcasting station.

SUMMARY OF THE INVENTION

The present invention provides a digital broadcasting receiving apparatus and a method of upgrading software thereof capable of stably performing software upgrade at all times, since software upgrade is implemented by considering the status of a headend each time the upgrade is performed.

According to an aspect of the present invention, there is provided a digital broadcasting receiving apparatus comprising a memory interface unit which supports an interface with an external memory device, a platform unit which requests a headend whether an upgrade of software is acceptable when the external memory device is connected to the memory interface unit, and a function execution unit which upgrades previously installed software using software in the external memory device when notified from the headend that the upgrade of software is acceptable.

When the upgrade of software is started in the function execution unit, the platform unit can notify the headend that the upgrade of software has been started.

When the upgrade of software is completed in the function execution unit, the platform unit can notify the headend that the upgrade of software has been completed.

When the upgrade of software is completed in the function execution unit, the platform unit can request the headend whether a rebooting of the digital broadcasting receiving apparatus is acceptable, and the function execution unit can perform the rebooting of the digital broadcasting receiving apparatus when notified from the headend that the rebooting is acceptable, and the function execution unit can operate with the previously installed software when notified from the headend that the rebooting is not acceptable.

The apparatus may further comprise a display unit for displaying a message indicating that the upgrade of software is not acceptable, when notified from the headend that the rebooting is not acceptable.

The platform unit may comprise an API unit which provides at least one API, an API execution unit which executes the provided at least one API, and a native interface unit which supports an interface between the API execution unit and the function execution unit.

The APIs may comprise an API which requests whether the upgrade of software is acceptable, an API which indicates that the upgrade of software has been started, an API which indicates that the upgrade of software has been completed, and an API which requests whether the rebooting of the digital broadcasting receiving apparatus is acceptable.

According to another aspect of the present invention, there is provided a method of upgrading software of a digital broadcasting receiving apparatus comprising requesting a headend whether an upgrade of software is acceptable when an external memory device is connected, receiving a notification from the headend of whether the upgrade of software is acceptable, and upgrading previously installed software using software in the external memory device when notified that the upgrade of software is acceptable.

The upgrading the previously installed software may comprise starting the upgrade of software, notifying the headend that the upgrade of software has been started, and notifying the headend that the upgrade of software has been completed when the upgrade of software is completed.

The method may further comprise requesting the headend whether a rebooting of the digital broadcasting receiving apparatus is acceptable when the upgrade of software is completed, receiving a notification from the headend of whether the rebooting is acceptable, and performing the rebooting of the digital broadcasting receiving apparatus when notified from the headend that the rebooting is acceptable, and operating with the previously installed software when notified from the headend that the rebooting is not acceptable.

The method may further comprise displaying a message indicating that the upgrade of software is not acceptable when notified from the headend that the rebooting is not acceptable.

The requesting whether the upgrade of software is acceptable may comprise the providing at least one API, and executing one of the provided at least one API, and the upgrading the previously installed software may comprise upgrading the previously installed software using a native API corresponding to the executed API.

The APIs may comprise an API which requests whether the upgrade of software is acceptable, an API which indicates that the upgrade of software has been started, an API which indicates that the upgrade of software has been completed, and an API which requests whether the rebooting is acceptable.

BRIEF DESCRIPTION OF THE DRAWINGS

Above and other aspects of the present invention will become apparent and more readily appreciated from the following description of the exemplary embodiments, taken in conjunction with the accompany drawings of which:

FIG. 3 is a flowchart for explaining a method of upgrading software of a digital broadcasting receiving apparatus according to an exemplary embodiment of the present invention; and FIG. 4 is a flowchart for explaining a method of upgrading software of a digital broadcasting receiving apparatus according to another exemplary embodiment of the present invention.

DETAILED DESCRIPTION OF EXEMPLARY EMBODIMENTS OF THE INVENTION

Certain exemplary embodiments of the present invention will be described in greater detail with reference to the accompanying drawings.

First of all, a digital broadcasting receiving apparatus according to an exemplary embodiment of the present invention is a device to provide interactive services by OCAP and ACAP specifications, and it provides the interactive services by a headend, such as a broadcasting station, and a prescribed specification.

The OCAP specification transmits/receives broadcasting signals and data through a communication channel such as a cable. Moreover, the ACAP specification receives broadcasting signals and data through sky wave, and transmits data through a cable.

Figure 1:
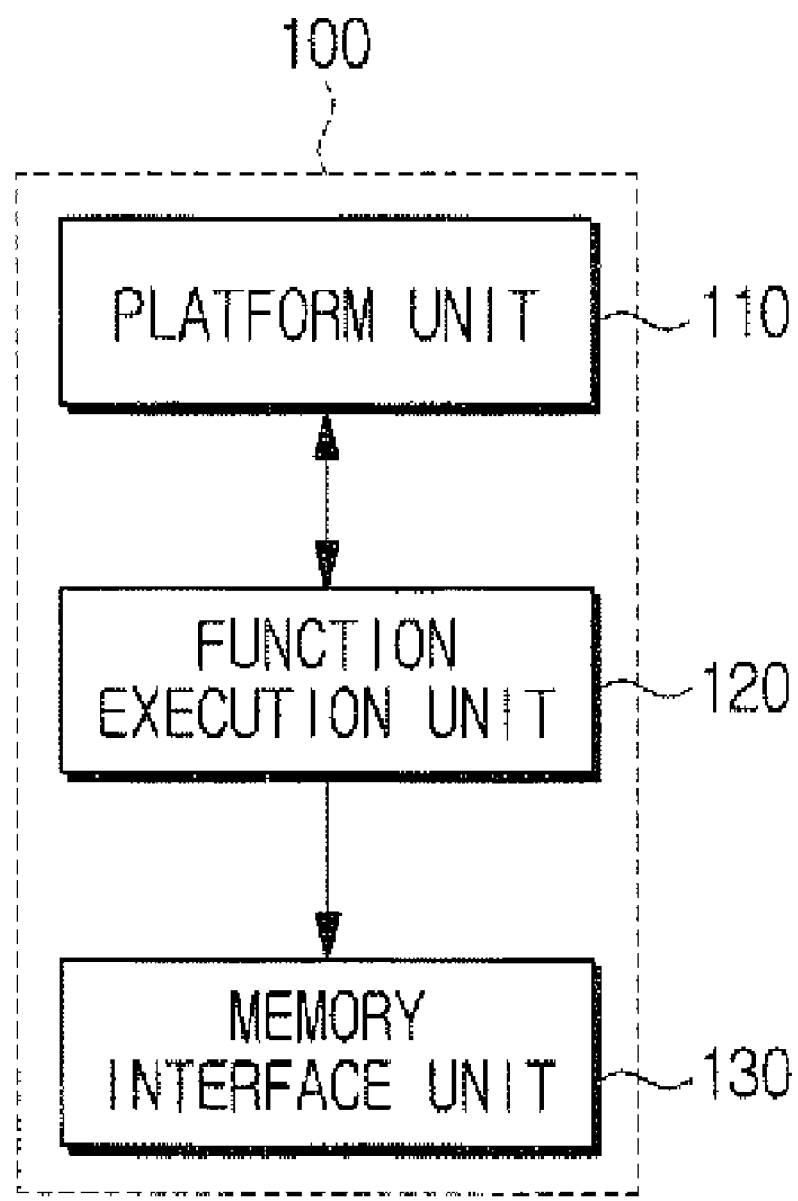
FIG. 1 is a block diagram of a digital broadcasting receiving apparatus according to an exemplary embodiment of the present invention.

FIG. 1 is a block diagram of a digital broadcasting receiving apparatus according to an exemplary embodiment of the present invention.

Referring to FIG. 1, a digital broadcasting receiving apparatus 100 comprises a platform unit 110, a function execution unit 120, and a memory interface unit 130.

The platform unit 110 communicates with a headend through a prescribed interface. The headend refers to a device functioning to transform a broadcasting signal for each channel into an intermediate frequency band, adjust its video and audio level, retransform into a form of ultra-high frequency, and then mix each signal for transmitting across a relay transport network, and it typically means a broadcasting station.

The platform unit 110, when identified by the function execution unit 120 that an external memory device (not shown) is connected to the memory interface unit 130, requests the headend whether an upgrade of software is acceptable, and receives a reply from the headend whether the upgrade of software is acceptable.

The platform unit 110, when the upgrade is completed in the function execution unit 120, requests the headend whether rebooting is acceptable, and receives a reply from the headend whether the rebooting is acceptable.

The function execution unit 120, when the external memory device is connected to the memory interface unit 130, compares a version of software within the external memory device with a version of previously installed software in the digital broadcasting receiving apparatus 100 to determine whether they are identical.

The function execution unit 120, only when the two software versions are different, allows the platform unit 110 to request the headend whether the upgrade of software is acceptable. It is because the upgrade is additionally unnecessary when the two software versions are identical. In other words, the upgrade is preferably performed when the version of software stored in the external memory device is a later version than that of software previously installed in the digital broadcasting receiving apparatus 100.

The function execution unit 120, when notified from the headend that the upgrade of software is acceptable, upgrades the previously installed software using the software of the external memory device connected to the memory interface unit 130. Furthermore, the function execution unit 120, when notified from the headend through the platform unit 110 that rebooting is acceptable, reboots the digital broadcasting receiving apparatus 100.

The memory interface unit 130 supports an interface between the external memory device and the digital broadcasting receiving apparatus 100. In other words, the external memory device can be connected to the memory interface unit 130. The external memory device may be a portable storage medium such as a Universal Serial Bus (USB) memory stick.

In this exemplary embodiment, it is illustrated a configuration comprising the platform unit 110, the function execution unit 120, and the memory interface unit 130 in the digital broadcasting receiving apparatus 100, and a more specific configuration of the digital broadcasting receiving apparatus 100 will be described in FIG. 2 as follows.

Figure 2:
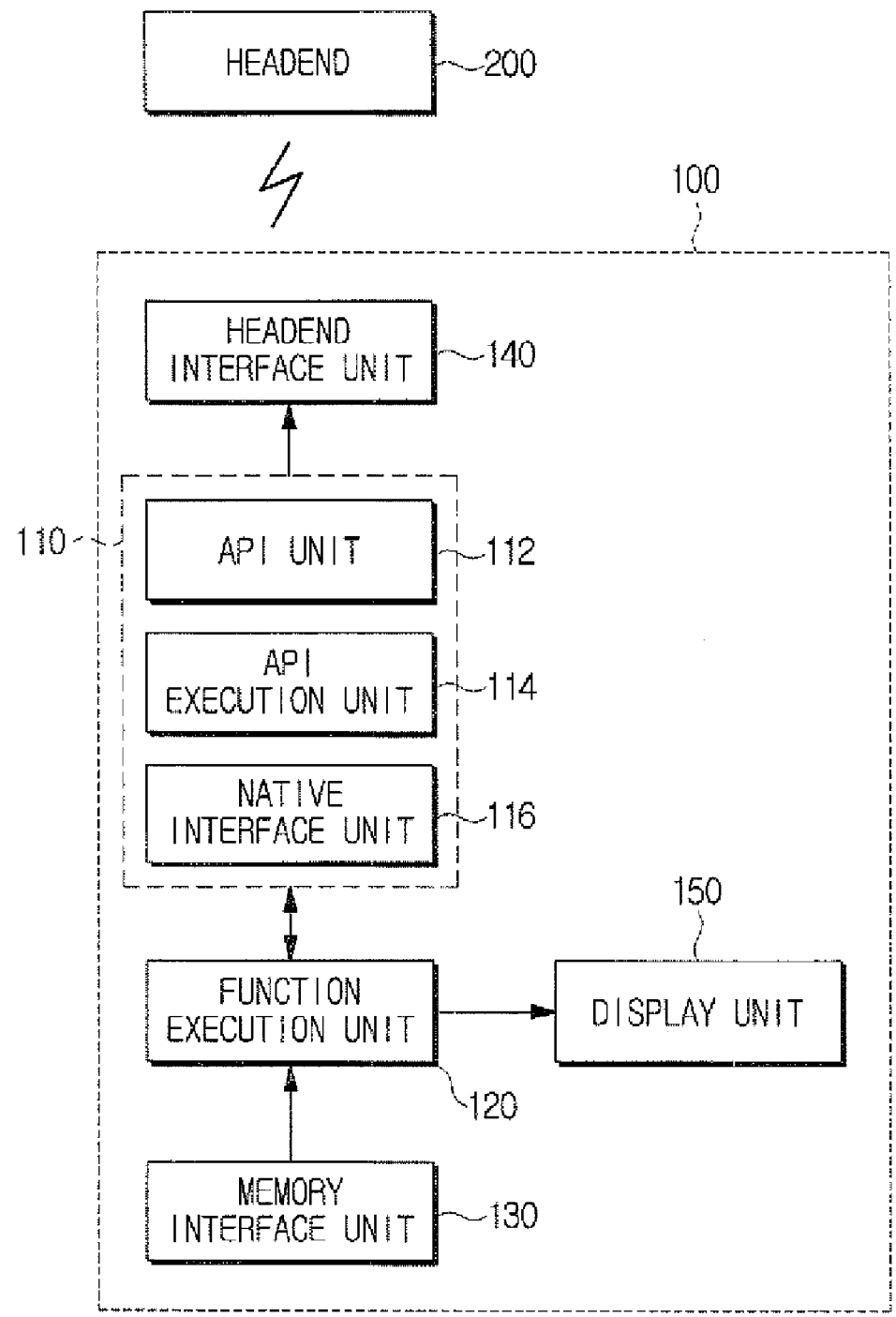
FIG. 2 is a block diagram of a digital broadcasting receiving apparatus according to another exemplary embodiment of the present invention.

FIG. 2 is a block diagram of a digital broadcasting receiving apparatus according to another exemplary embodiment of the present invention.

Referring to FIG. 2, a digital broadcasting receiving apparatus 100 comprises a headend interface unit 140, a platform unit 110, a function execution unit 120, a memory interface unit 130, and a display unit 150. It is illustrated a detailed configuration of the digital broadcasting receiving apparatus 100, and duplicate explanations are omitted and the same numerals are assigned, since the function of the platform unit 110, the function execution unit 120 and the memory interface unit 130 is the same as those of FIG. 1.

The headend interface unit 140 supports an interface between a headend 200 and the digital broadcasting receiving apparatus 100. The headend interface unit 140 is typically a Cable CARD for providing a physical interface with the headend 200.

The headend interface unit 140 transmits an API called from the platform unit 110 to the headend 200, and receives a reply to the transmitted API.

For example, the headend interface unit 140 can transmit to the headend 200 an API for requesting the headend 200 whether the upgrade of software is acceptable, an API for indicating that the upgrade of software has been started, an API for indicating that the upgrade of software has been completed, and an API for requesting whether rebooting is acceptable after completing the upgrade of software.

An API refers to a set of functions provided for an application program. The API can be realized through a programming language such as Java, but is not necessarily limited to this. The APIs in this exemplary embodiment are described as Java APIs, for example.

Furthermore, the headend interface unit 140 can receive from the headend 200, a reply to an API for requesting whether the upgrade of software is acceptable, and an API for requesting whether it will be rebooted after completing the upgrade of software.

The platform unit 110, when identified that an external memory device is connected to the memory interface unit 130 through the function execution unit 120, requests the headend 200 whether the upgrade of software is acceptable.

Thereafter, the platform unit 110 notifies the headend 200 that the upgrade of software has been started or completed, and requests the headend 200 whether rebooting is acceptable after completing the upgrade of software.

The platform unit 110 can communicate with the headend 200 using an API through the headend interface unit 140. For this, the platform unit 110 comprises an API unit 112, an API execution unit 114, and a native interface unit 116.

The API unit 112 provides standard APIs requested by the headend 200. The standard APIs are APIs designated by the OCAP or ACAP specification, and separate APIs are provided for each function. As described above, the APIs in this exemplary embodiment is Java APIs.

The API unit 112 comprises typical APIs used for communication between the headend 200 and the digital broadcasting receiving apparatus 100, and further comprises APIs related to software upgrade. The APIs added to the API unit 112 in this exemplary embodiment are illustrated in Table 1.

TABLE 1

| API | Function |
|---|---|
| GetNativeSWUpgradeEnable( ) | An API for requesting whether upgrade of software is acceptable. |
| NotifyNativeSWUpgradeStart( ) | An API for requesting that upgrade of software has been started. |
| NotifyNativeSWUpgradeEnd( ) | An API for requesting that upgrade of software has been completed. |
| GetRebootEnable( ) | An API for requesting whether it will be rebooted after completing upgrade of software. |

The API execution unit 114 executes an API, which is provided from the API unit 112, in order to provide a function of an API called from the headend 200. Specifically, the API execution unit 114, when 'GetNativeSWUpgradeEnable( )' is provided from the API unit 112, requests the headend 200 through the headend interface unit 140 whether a software upgrade is acceptable. The API execution unit 114, when 'NotifyNativeSWUpgradeStart( )' is provided from API unit 112, notifies the headend 200 through the headend interface unit 140 that the software upgrade has been started. The API execution unit 114, when 'NotifyNativeSWUpgradeEnd( )' is provided from the API unit 112, notifies the headend 200 through the headend interface unit 140 that the software upgrade has been completed. Furthermore, the API execution unit 114, when 'GetRebootEnable( )' is provided from the API unit 112, requests the headend 200 through the headend interface unit 140 whether it will be rebooted after completing the upgrade of software.

The native interface unit 116 supports an interface between the API execution unit 114 designed by Java language and the function execution unit 120 designed by a native language. By this, when notified from the headend 200 that an upgrade is acceptable, the API execution unit 114 can control the function execution unit 120 to perform the upgrade.

Specifically, the native interface unit 116 transforms an API realized by Java language into an API having the relevant function realized by the native language, and the transformed native API is called to the function execution unit 120.

One or more function execution units 120 may be configured, and the function execution unit 120 realizes the function corresponding to an API executed by the API execution unit 114. In this exemplary embodiment, the function execution unit 120, when notified from the headend 200 that software upgrade is acceptable, performs an upgrade of software. Furthermore, the function execution unit 120 reboots the digital broadcasting receiving apparatus 100 when notified from the headend 200 that rebooting is acceptable.

In order to perform such a function, the function execution unit 120 has native APIs for each function designed by the native language. The "native language" means programming languages such as C, C+, and C++.

The memory interface unit 130 supports an interface between the external memory device and the digital broadcasting receiving apparatus 100. As stated in FIG. 1, since the external memory device is a USB storage medium such as a USB memory stick, the memory interface unit 130 may be a USB connector to which the USB storage medium is connected.

The display unit 150 displays broadcasting signals and data provided from the headend 200. Furthermore, the display unit 150 can display a message provided from the function execution unit 120 for a user to recognize.

In this exemplary embodiment, the display unit 150, when notified from the headend 200 that an upgrade of software is not acceptable, displays a message indicating that the upgrade of software is not acceptable. Furthermore, the display unit 150 may display a message by control of the function execution unit 120, such that the user chooses whether or not to continue the upgrade process.

FIG. 3 is a flowchart for explaining a method of upgrading software of a digital broadcasting receiving apparatus according to an exemplary embodiment of the present invention Referring to FIG. 1 and FIG. 3, a method of upgrading software of the digital broadcasting receiving apparatus 100 according to an exemplary embodiment of the present invention will be described.

An external memory device is connected to the memory interface unit 130 (S300). The function execution unit 120, when identified that the external memory device is connected to the memory interface unit 130, notifies this to the platform unit 110.

The platform unit 110 requests the headend 200 using a relevant API whether an upgrade of software is acceptable (S310). The platform unit 110 receives a reply to the request for whether the upgrade of software is acceptable from the headend 200.

When notified from the headend 200 that the upgrade of software is acceptable (S320-Y), the platform unit 110 notifies the function execution unit 120 that the upgrade of software is acceptable, and the function execution unit 120 performs the upgrade of previously installed software using software in the external memory device (S330).

If notified from the headend 200 that the upgrade of software is not acceptable (S320-N), the upgrade of software will not be performed, and the process will be finished. By this, the digital broadcasting receiving apparatus 100 can perform the upgrade of software only by permission of the headend 200.

FIG. 4 is a flowchart for explaining a method of upgrading software of a digital broadcasting receiving apparatus according to another exemplary embodiment of the present invention.

Referring to FIG. 2 and FIG. 4, a method of upgrading software of the digital broadcasting receiving apparatus 100 according to another exemplary embodiment of the present invention will be described.

An external memory device is connected to the memory interface unit 130 (S401). At this time, software of the digital broadcasting receiving apparatus 100 is stored in the external memory device, and a user connects the external memory device to the digital broadcasting receiving apparatus 100 when he or she wants to upgrade software of the digital broadcasting receiving apparatus 100.

The function execution unit 120 compares a version of the software in the external memory device with that of the software previously installed in the digital broadcasting receiving apparatus 100. By this, when the two software versions are identical (S403-N), the process will be finished since the upgrade is not necessary.

As a result of the comparing the version of the software in the external memory device with that of the previously installed software in the function execution unit 120, when the two software versions are different (S403-Y), a message requesting the user whether he or she wants to proceed the upgrade is displayed through the display unit 150.

As a result of the user's selection, when the user selects to proceed with the upgrade (S405-Y), the platform unit 110 requests the headend 200 whether the upgrade of software is acceptable. At this time, by the API unit 112, for example, 'GetNativeSWUpgradeEnable( )' is provided, and the API execution unit 114 executes the 'GetNativeSWUpgradeEnable( )' (S407).

The headend 200 transmits a reply to the request from the digital broadcasting receiving apparatus 100 for whether the upgrade is acceptable. As a result of the reply from the headend 200, when notified that the upgrade is acceptable (S409-Y), the platform unit 110 notifies the headend 200 that the upgrade has been started using 'NotifyNativeSWUpgradeStart( )' (S411), and the function execution unit 120 performs the upgrade of the previously installed software using the software in the external memory device (S415).

If notified from the headend 200 that the upgrade is not acceptable (S409-N), the function execution unit 120 displays a message indicating the upgrade is not acceptable on the display unit 150 (S413). Thereafter, the upgrade of software will not proceed.

When the upgrade is completed after the upgrade of the function execution unit 120 proceed (S417-Y), the platform unit 110 notifies the headend 200 that the upgrade has been completed using 'NotifyNativeSWUpgradeEnd( )' (S419).

The platform unit 110 requests the headend 200 whether rebooting is acceptable using 'GetRebootEnable( )' (S421). To this, the headend 200 transmits a reply to the request for whether rebooting is acceptable.

When notified from the headend 200 that rebooting is acceptable (S423-Y), the function execution unit 120 performs the rebooting of the digital broadcasting receiving apparatus 100 (S425). If notified from the headend 200 that rebooting is not acceptable (S423-N), it operates using the previously installed software until rebooting is performed by the user (S427).

As stated above, in a method of upgrading software of a digital broadcasting receiving apparatus according to an exemplary embodiment of the present invention, when an upgrade is implemented without using software provided from a headend but using software provided by a user, all of the procedures can proceed only by the permission of the headend.

As described above, a digital broadcasting receiving apparatus and a method for upgrading software thereof according to an exemplary embodiment of the present invention has an effect that an upgrade and a rebooting in the digital broadcasting receiving apparatus can be performed by considering the status of a headend, since a process for upgrading and rebooting the software is implemented by a permission of the headend.

Furthermore, any modifications implemented in software by a user can be managed in a headend, and therefore it has an effect that an upgrade of software can be stably performed.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A digital broadcasting receiving apparatus comprising:
   a memory interface unit which supports an interface with a local external memory device;
   a platform unit which transmits to a remote headend a request of whether an upgrade of software is acceptable, when the external memory device is connected to the memory interface unit; and
   a function execution unit which upgrades previously installed software using software in the external memory device, when notified from the headend that the upgrade of software is acceptable.

2. The digital broadcasting receiving apparatus of claim 1, wherein when the upgrade of software is started in the function execution unit, the platform unit notifies the headend that the upgrade of software has been started.

3. The digital broadcasting receiving apparatus of claim 1, wherein when the upgrade of software is completed in the function execution unit, the platform unit notifies the headend that the upgrade of the software has been completed.

4. The digital broadcasting receiving apparatus of claim 1, further comprising a display unit which displays a message indicating that the upgrade of software is not acceptable, when notified from the headend that the upgrade of software is not acceptable.

5. The digital broadcasting receiving apparatus of claim 1, wherein the platform unit comprises:
   an Application Program Interface (API) unit which provides at least one API;
   an API execution unit which executes the provided at least one API; and
   a native interface unit which supports an interface between the API execution unit and the function execution unit.

6. The digital broadcasting receiving apparatus of claim 5, wherein the at least one API comprises:

an API which requests whether the upgrade of software is acceptable;
an API which indicates that the upgrade of software has been started;
an API which indicates that the upgrade of software has been completed; and
an API which requests whether a rebooting of the digital broadcasting receiving apparatus is acceptable.

7. The digital broadcasting receiving apparatus of claim 1, wherein when the upgrade of software is completed in the function execution unit, the platform unit transmits a request to the headend requesting whether a rebooting of the digital broadcasting receiving apparatus is acceptable.

8. The digital broadcasting receiving apparatus of claim 7, wherein the function execution unit performs the rebooting of the digital broadcasting receiving apparatus when notified from the headend that the rebooting is acceptable.

9. A digital broadcasting receiving apparatus comprising:
a memory interface unit which supports an interface with an external memory device;
a platform unit which requests a headend whether an upgrade of software is acceptable, when the external memory device is connected to the memory interface unit; and
a function execution unit which upgrades previously installed software using software in the external memory device, when notified from the headend that the upgrade of software is acceptable,
wherein when the upgrade of software is completed in the function execution unit, the platform unit requests the headend whether a rebooting of the digital broadcasting receiving apparatus is acceptable, and
wherein the function execution unit performs the rebooting of the digital broadcasting receiving apparatus when notified from the headend that the rebooting is acceptable, and the function execution unit operates with the previously installed software when notified from the headend that the rebooting is not acceptable.

10. A method of upgrading software of a digital broadcasting receiving apparatus, the method comprising:
transmitting to a remote headend a request of whether an upgrade of software is acceptable, when a local external memory device is connected;
receiving a notification from the headend of whether the upgrade of software is acceptable; and
upgrading previously installed software using software in the external memory device, when notified that the upgrade of software is acceptable.

11. The method of claim 10, wherein the upgrading the previously installed software comprises:
starting the upgrade of software;
notifying the headend that the upgrade of software has been started; and
notifying the headend that the upgrade of software has been completed, when the upgrade of software is completed.

12. The method of claim 10, further comprising displaying a message indicating that the upgrade of software is not acceptable, when notified from the headend that the upgrade of software is not acceptable.

13. The method of claim 10, wherein the requesting whether the upgrade of software is acceptable comprises providing at least one Application Program Interface (API) and executing one of the provided at least one API, and
wherein the upgrading the previously installed software comprises upgrading the previously installed software using a native API corresponding to the executed API.

14. The method of claim 13, wherein the at least one API comprises:
an API which requests whether the upgrade of software is acceptable;
an API which indicates that the upgrade of software has been started;
an API which indicates that the upgrade of software has been completed; and
an API which requests whether a rebooting of the digital broadcasting receiving apparatus is acceptable.

15. The method of claim 10, further comprising:
requesting the headend whether a rebooting of the digital broadcasting receiving apparatus is acceptable, when the upgrade of software is completed.

16. The method of claim 15, further comprising:
receiving a notification from the headend of whether the rebooting is acceptable; and
performing the rebooting of the digital broadcasting receiving apparatus when notified from the headend that the rebooting is acceptable.

17. A method of upgrading software of a digital broadcasting receiving apparatus, the method comprising:
requesting a headend whether an upgrade of software is acceptable, when an external memory device is connected;
receiving a notification from the headend of whether the upgrade of software is acceptable;
upgrading previously installed software using software in the external memory device, when notified that the upgrade of software is acceptable;
requesting the headend whether a rebooting of the digital broadcasting receiving apparatus is acceptable, when the upgrade of software is completed;
receiving a notification from the headend of whether the rebooting is acceptable; and
performing the rebooting of the digital broadcasting receiving apparatus when notified from the headend that the rebooting is acceptable, and operating with the previously installed software when notified from the headend that the rebooting is not acceptable.

* * * * *